United States Patent
Jang et al.

(10) Patent No.: US 7,231,620 B2
(45) Date of Patent: Jun. 12, 2007

(54) APPARATUS, GENERATOR, AND METHOD FOR CLOCK TREE SYNTHESIS

(75) Inventors: Mi-Sook Jang, Yongin (KR); Hoi-Jin Lee, Seongnam (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 355 days.

(21) Appl. No.: 10/768,056

(22) Filed: Feb. 2, 2004

(65) Prior Publication Data

US 2004/0169531 A1  Sep. 2, 2004

(30) Foreign Application Priority Data

Feb. 27, 2003  (KR) .................. 10-2003-0012325

(51) Int. Cl.
*G06F 17/50* (2006.01)
*G06F 9/45* (2006.01)

(52) U.S. Cl. ................... 716/6; 716/1; 716/18

(58) Field of Classification Search ............ 716/4, 716/1, 6, 18; 326/41, 46, 93; 327/295
See application file for complete search history.

(56) References Cited

U.S. PATENT DOCUMENTS

| | | | | |
|---|---|---|---|---|
| 5,923,188 | A * | 7/1999 | Kametani et al. | 326/93 |
| 6,020,774 | A * | 2/2000 | Chiu et al. | 327/295 |
| 6,489,824 | B2 * | 12/2002 | Miyazaki et al. | 327/158 |
| 6,941,533 | B2 * | 9/2005 | Andreev et al. | 716/6 |
| 2001/0020859 | A1 * | 9/2001 | Saeki | 327/271 |
| 2003/0214324 | A1 * | 11/2003 | How et al. | 326/41 |
| 2003/0218480 | A1 * | 11/2003 | Swami et al. | 326/46 |
| 2004/0060012 | A1 * | 3/2004 | Lu et al. | 716/1 |

\* cited by examiner

*Primary Examiner*—Jack Chiang
*Assistant Examiner*—Nghia M. Doan
(74) *Attorney, Agent, or Firm*—Harness, Dickey & Pierce, P.L.C.

(57) ABSTRACT

A clock tree synthesis (CTS) apparatus, generator, and method for synthesizing a clock tree includes a plurality of clock signal generators that output different clock signals generated from a reference clock signal. The clock signal generators includes an additional logic circuit that is not recognized as an end point of the reference clock signal when the clock tree is synthesized. In one example, the clock signal generator is a flip-flop and the additional logic circuit is a tri-state buffer.

14 Claims, 3 Drawing Sheets

APPARATUS, GENERATOR, AND METHOD FOR CLOCK TREE SYNTHESIS

RELATED APPLICATION

This application claims the benefit of priority of Korean Patent Application No. 2003-12325, filed on 27 Feb. 2003, in the Korean Intellectual Property Office, the contents of which are herein incorporated by reference in their entirety.

1. Field of the Invention

The present invention relates to an apparatus, generator, and method for clock tree synthesis, which balance clock skew between different elements of a semiconductor circuit.

2. Description of the Related Art

In the manufacture of semiconductor circuits, advances have been made in reducing the size and/or power consumption of large scale integrated (LSI) circuits while also improving their performance. To make designs of LSI circuits simpler, some designers adopt a synchronous circuit strategy of dividing a circuit into a clock part and a logic part. In designing the logic part, a clock signal is assumed to reach the various elements that are physically distributed throughout the chip at the same time. However, clock skew may occur due to differences in signal propagation delays between transmission lines. A resistance difference between the transmission lines may introduce the difference in signal propagation delays. Often, it is beneficial to balance clock skews between transmission lines.

FIG. 1 illustrates a conventional clock tree circuit. Referring to FIG. 1, the clock tree circuit includes a multiplexer 14 that selectively outputs different clock signals generated from a reference clock signal XCLK passing through different transmission lines. To generate different clock signals, the reference clock signal XCLK generated by a reference clock signal generator (not shown) passes through four (for example) different transmission paths. In a first path 10, the signal passes through an inverter 10-1. In the second path 11, the signal does not pass through any elements. In the third path 12, the signal passes through a flip-flop 12-1 that divides the clock signal at a ratio of 1:2. In the fourth path 13, the signal passes through two flip-flops 13-1 and 13-2 that are connected in series and divides the clock signal at a ratio of 1:4.

The clock signals passing through the paths containing the flip-flop 12-1, or the flip-flops 13-1, and 13-2 skew the clock signals passing through the first path 10 or the second path 11. In clock tree synthesis (CTS) for balancing clock skew, the clock tree is synthesized using the reference clock signal XCLK to a point where the reference clock signal XCLK reaches clock signal input pins of clock generator, namely, flip-flops 12-1, 13-1, and 13-2. In other words, the clock signal input pins of the clock generators are the end points of CTS. When CTS is performed by taking the reference clock signal XCLK as a start point and inputs to multiplexer 14 as end points, the skew of the clock on a path on which combinational logic, such as an inverter or AND gate are located may not be balanced with the skew of the clock on a path on which flip-flops are located or the skew of the clock on a path where no circuits are located.

Accordingly, it may be difficult to construct a balanced clock tree circuit by using the reference clock signal XCLK as a CTS point, due to the presence of circuits, such as flip-flops 12-1, 13-1, and 13-2.

SUMMARY OF THE INVENTION

Exemplary embodiments of the present invention provide an apparatus and method of clock tree synthesis (CTS), which do not use clock signal input pins of flip-flops as end points of CTS.

In an exemplary embodiment, the present invention provides an apparatus for clock tree synthesis, in which a clock tree outputs different clock signals generated from a reference clock signal. The apparatus comprises at least one clock signal generator which generates signals different from the reference signal. The clock signal generator further includes an additional logic circuit which is not recognized as an end point of the reference clock signal when the clock tree is synthesized. The additional logic circuit may be a tri-state buffer.

In another exemplary embodiment, the present invention provides a clock generator including a flip-flop and an additional circuit. The additional may be a tri-state buffer which introduces a delay corresponding to a delay introduced by the flip-flop. The tri-state buffer is not recognized as an end point of the reference clock signal when a clock tree is synthesized.

In another exemplary embodiment, the present invention provides a method for clock tree synthesis, in which a clock tree outputs different clock signals generated from a reference clock signal. The method includes generating a reference clock signal, generating a plurality of clock signals with different timing from the reference clock signal, introducing at least one delay to compensate for the different timings, and synthesizing a clock tree from the compensated different timings.

BRIEF DESCRIPTION OF THE DRAWINGS

The above and other features of the present invention will become readily apparent from the description of the exemplary embodiments that follows, with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2:
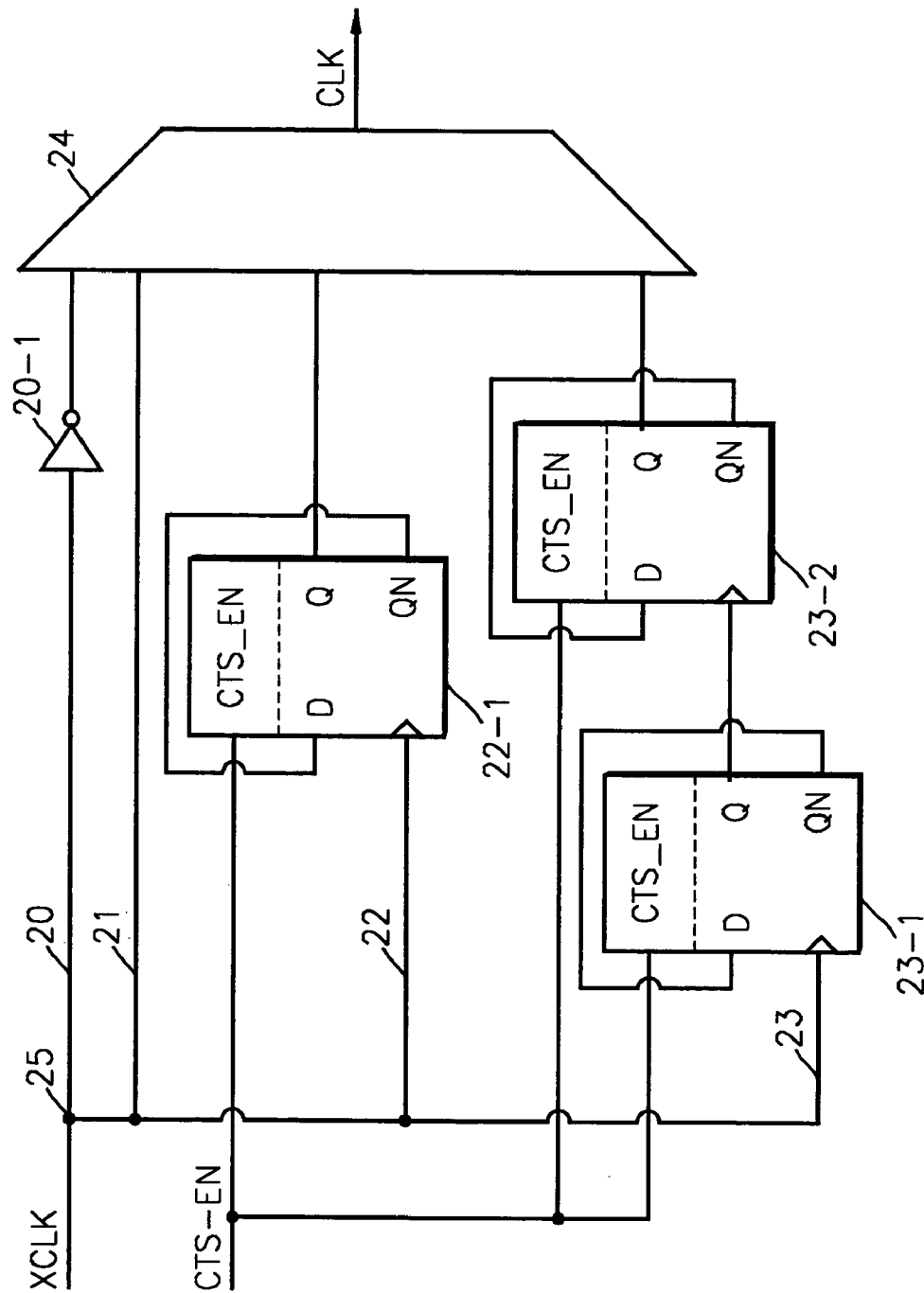
FIG. 2 illustrates a clock tree circuit for clock tree synthesis (CTS) according to an exemplary embodiment of the present invention.
Figure 3:
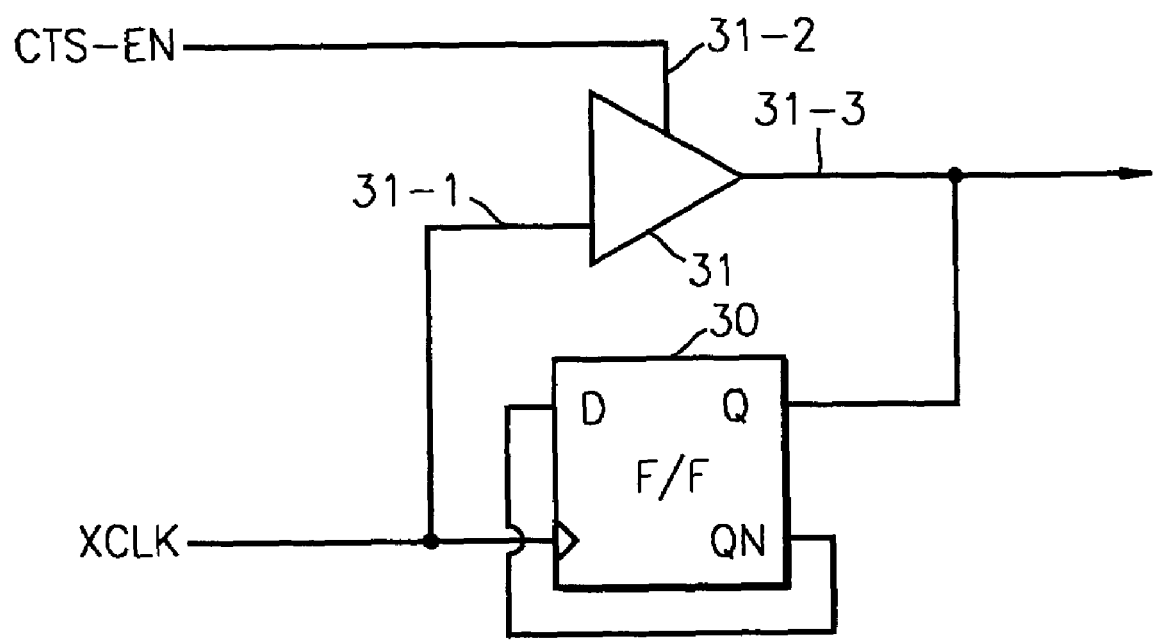
FIG. 3 illustrates a configuration of a clock signal generating circuit according to an exemplary embodiment of the present invention.

FIG. 2 illustrates a clock tree circuit for clock tree synthesis CTS according to an exemplary embodiment of the present invention, and FIG. 3 illustrates a configuration of a clock signal generating circuit for CTS according to an exemplary embodiment of the present invention.

Referring to FIG. 2, the clock tree circuit according to an exemplary embodiment of the present invention includes a multiplexer 24 that is connected to a reference clock signal generator (not shown) and selectively outputs different clock signals generated from a reference clock signal XCLK passing through multiple transmission paths. In a first path 20, the clock signal XCLK passes through an inverter 20-1 that inverts the phase of the signal. In the second path 21, the clock signal XCLK passes directly to the multiplexer 24. In the third path 22, the clock signal XCLK passes through a clock signal generating circuit 22-1. In the fourth path 23, the clock signal XCLK passes through a clock signal generating circuit which includes a first circuit 23-1 and a second circuit 23-2 that are connected in series.

During CTS, the delays of each path are equalized until the paths starting from a CTS point, for example, CTS point 1 meet a clock pin. In FIG. 2, the clock pin is the clock signal input pin of each of the D flip-flops, for example, when an XCLK signal meets a clock pin of a flip-flop, CTS is terminated.

Figure 1:
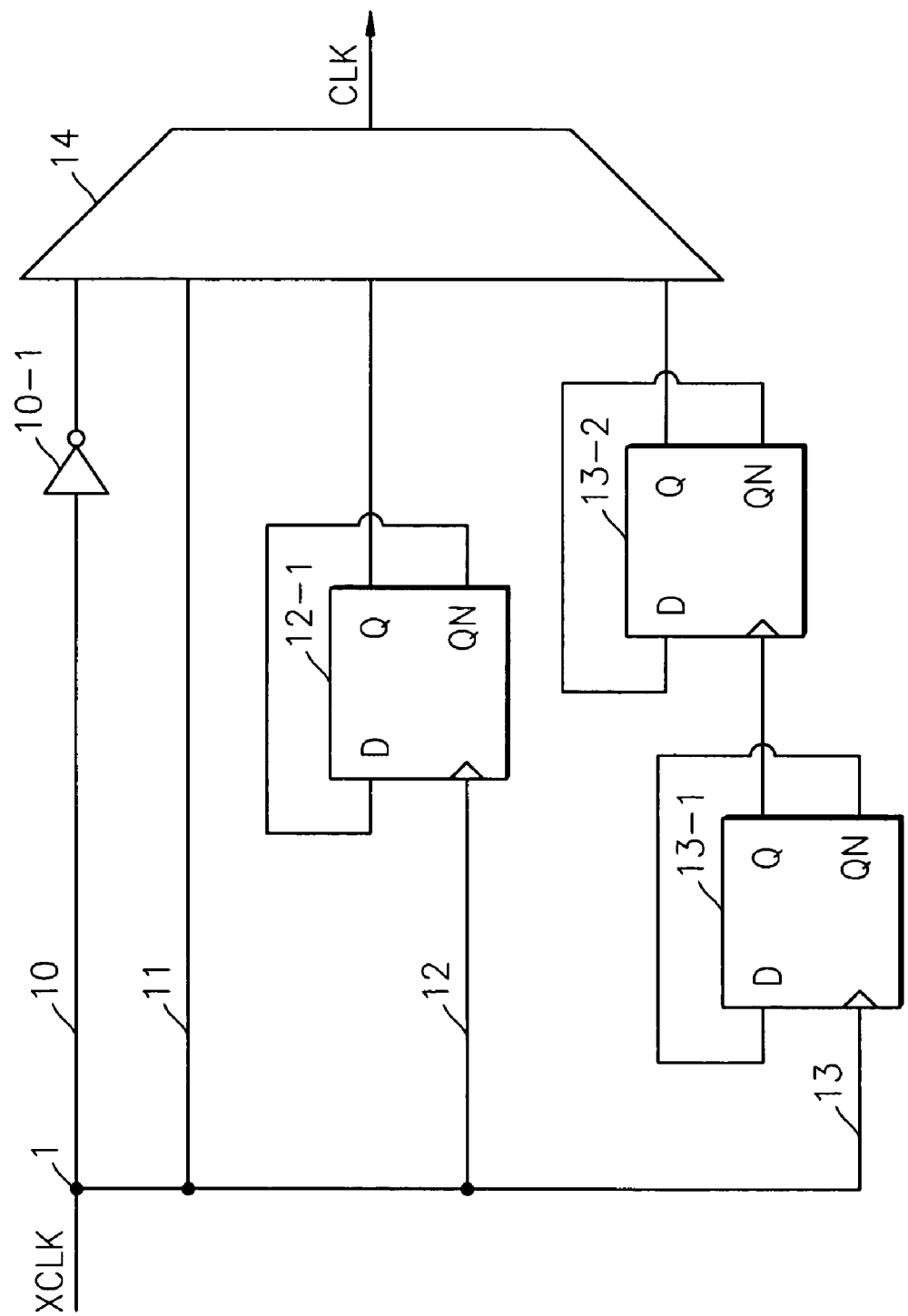
FIG. 1 illustrates a conventional clock tree circuit.

For example, if a flip-flop is employed in the conventional art, as shown in FIG. 1, delays of each path from the CTS point 1, where the XCLK signal is introduced to the four input pins of the MUX 14 cannot be effectively equalized because the CTS is performed from the CTS point 1, where XCLK is introduced to the clock pins of the flip-flops. In contrast, when CTS is enabled in exemplary embodiments of the present invention, automatic CTS may be performed, for example by using a tri-state buffer, instead of a flip-flop.

As shown in FIG. 3, the clock signal generating circuit 22-1, 23-1 and 23-2 according to an exemplary embodiment of the present invention includes a flip-flop 30 and an additional logic circuit that is not recognized as an end point of CTS by the reference clock signal XCLK. In an exemplary embodiment of the present invention, a tri-state buffer 31 is the additional logic circuit. The reference clock signal XCLK is input to an input terminal 31-1 of the tri-state buffer 31. A CTS enable signal CTS_EN is input to a control terminal 31-2 of the tri-state buffer 31. An output terminal 31-3 of the tri-state buffer 31 is connected to a Q terminal of the flip-flop 30. A delay introduced by the tri-state buffer 31 (from its input terminal 31-1 to its output terminal 31-3) is equal to a delay introduced by the flip-flop 30 (from the reference clock signal XCLK to its Q terminal). When the CTS enable signal CTS_EN is "0", the tri-state buffer 31 is disabled and then only the flip-flop 30 operates. When the CTS enable signal CTS_EN is '1", the tri-state buffer 31 is enabled.

When the CTS enable signal CTS_EN is "1", if viewed from a CTS point 25 of the clock tree circuit of FIG. 2, the third path 22 is a path including one tri-state buffer and the fourth path 23 is a path including two tri-state buffers. As a result, CTS will not be terminated at clock signal input pins of flip-flops 22-1, 23-1, and 23-2. Thus, by using buffers that introduce delays corresponding to clock delays for each transmission path, it may be possible to balance clock skews between transmission paths.

According to exemplary embodiments of the present invention, when synthesizing a clock tree including one or more flip-flops, the automatic CTS is enabled by further including one or more combinational logic circuits in addition to the one or more flip-flops. The one or more combinational logic circuits introduce a delay corresponding to a delay introduced by the one or more flips-flops. In an exemplary embodiment, the flip-flop may be a D flip-flop as shown in FIG. 3. In other exemplary embodiments, the flip-flop may be another flip-flop, such as a J-K flip-flop, or any other circuit, as would be known to one of ordinary skill in the art. In an exemplary embodiment, the additional circuit may be a combinational logic circuit. In other exemplary embodiments, the additional circuit may be a buffer, such as a tri-state buffer, or any other circuit, as would be known to one of ordinary skill in the art. While the present invention has been particularly shown and described with reference to the exemplary embodiments described above, it will be understood by those skilled in the art that these embodiments do not limit the present invention, and that various changes in form and details may be made without departing from the spirit and scope of the present invention as defined by the appended claims.

What is claimed is:

1. A clock tree synthesis (CTS) apparatus for synthesizing a clock tree, the CTS apparatus comprising:
    at least one clock signal generator that outputs a clock signal with different timing from a reference clock signal, the at least one clock signal generator including an additional circuit that is not recognized as an end point of the reference clock signal when the clock tree is synthesized, and that introduces a delay corresponding to a delay introduced by the at least one clock signal generator to compensate for the different timing,
    wherein the additional circuit is a tri-state buffer that includes an input terminal connected to the reference clock signal, a control terminal connected to an externally supplied clock signal, and an output terminal connected to an output terminal of the at least one clock signal generator.

2. The apparatus of claim 1, further comprising:
    a clock signal transmission line transmitting the reference clock signal directly.

3. The apparatus of claim 1, further comprising:
    an inverter inverting the reference clock signal.

4. The apparatus of claim 1, wherein the clock signal generator is a flip-flop.

5. The apparatus of claim 1, wherein the additional circuit is a combinational logic circuit.

6. The apparatus of claim 1, wherein the externally supplied signal is a CTS enable signal.

7. The apparatus of claim 1, further comprising a multiplexer selectively outputting a clock signal generated by the at least one clock signal generator.

8. A clock signal generator, comprising:
    a flip-flop; and
    an additional circuit that is not recognized as an end point of a reference clock signal when a clock tree is synthesized, and that introduces a delay corresponding to a delay introduced by the flip-flop, wherein the additional circuit is a tri-state buffer that includes an input terminal connected to the reference clock signal, a control terminal connected to an externally supplied clock signal, and an output terminal connected to an output terminal of the flip-flop.

9. The clock signal generator of claim 8, wherein the additional circuit is a combinational logic circuit.

10. The clock signal generator of claim 8, wherein the externally supplied signal is a CTS enable signal.

11. A method for synthesizing a clock tree, comprising:
    generating a reference clock signal;
    generating a plurality of clock signals with different timing from the reference clock signal;
    introducing at least one delay to compensate for the different timings caused by a introduction of a delay corresponding to a delay introduced by at least one clock signal generator; and
    synthesizing a clock tree from the compensated different timings, wherein the at least one delay is introduced by an additional circuit, the additional circuit is a tri-state buffer that includes an input terminal connected to the reference clock signal, a control terminal connected to an externally supplied clock signal, and an output terminal connected to an output terminal of the at least one clock signal generator.

12. The method of claim 11, wherein the additional circuit is a combinational logic circuit.

13. A method for synthesizing a clock tree using a clock tree synthesis (CTS) apparatus the method comprising:
  providing at least one clock signal generator that outputs a clock signal different from a reference clock signal, the at least one clock signal generator including an additional circuit that is not recognized as an end point of the reference clock signal when the clock tree is synthesized.
  synthesizing a clock tree from the compensated different timings,
  wherein the additional circuit is a tri-state buffer that includes an input terminal connected to the reference clock signal, a control terminal connected to an externally supplied clock signal, and an output terminal connected to an output terminal of the at least one clock signal generator.

14. A method for synthesizing a clock tree using a clock signal generator, the method comprising:
  providing a flip-flop and an additional circuit that is not recognized as an end point of a reference clock signal when a clock tree is synthesized;
  generating a reference clock signal;
  generating a plurality of clock signals with different timing from the reference clock signal;
  introducing at least one delay to compensate for the different timings caused by a introduction of a delay corresponding to a delay introduced by the clock signal generator; and
  synthesizing a clock tree from the compensated different timings,
  wherein the additional circuit is a tri-state buffer that includes an input terminal connected to the reference clock signal, a control terminal connected to an externally supplied clock signal, and an output terminal connected to an output terminal of the at least one clock signal generator.

* * * * *